United States Patent [19]

Takada et al.

[11] Patent Number: 4,664,571
[45] Date of Patent: May 12, 1987

[54] TOOL ABNORMALITY DETECTOR

[75] Inventors: Reiji Takada, Higashiosaka; Tsutomu Aoki, Kashiwara, both of Japan

[73] Assignee: Nippon Pneumatic Manufacturing Co., Ltd., Osaka, Japan

[21] Appl. No.: 865,720

[22] Filed: May 22, 1986

[30] Foreign Application Priority Data

May 25, 1985 [JP] Japan .................. 60-112493

[51] Int. Cl.⁴ .................. B23Q 11/04; B23B 47/24
[52] U.S. Cl. .................. 409/134; 83/62.1; 408/6; 408/8; 409/148; 409/187; 409/194
[58] Field of Search .................. 408/6, 8, 11, 16; 409/134, 148, 187, 194, 231, 232, 234; 83/62, 62.1

[56] References Cited

U.S. PATENT DOCUMENTS

| 3,241,402 | 3/1966 | Crowell et al. | 408/6 |
| 3,728,919 | 4/1973 | Scott | 408/6 X |
| 4,180,356 | 12/1979 | Hoch | 408/8 |
| 4,504,824 | 3/1985 | Mello | 408/6 X |

FOREIGN PATENT DOCUMENTS 467793 5/1975 U.S.S.R. .................. 408/11

Primary Examiner—Gil Weidenfeld
Assistant Examiner—Steven C. Bishop

[57] ABSTRACT

A tool abnormality detector for use with a machine tool for detecting any abnormality of a tool mounted on the tool mounting shaft. When the tool mounting shaft is in a correct position with respect to the tubular body secured to the spindle, the air pressure is kept constant. When an abnormal resistance is applied to the tool mounting shaft, the latter will lag in rotation with respect to the tubular body, so that the exhaust air passage will be blocked. A pressure sensor detects an abnormal increase in the air supply line, giving a signal for stopping the spindle of the machine tool. This prevents the tool from damage.

3 Claims, 4 Drawing Figures

TOOL ABNORMALITY DETECTOR

The present invention relates to a device for detecting or foreseeing the abnormality of a tool mounted on an adapter mounted in the spindle of a machine tool or a machining center.

The Japanese Utility Model Unexamined Publication No. 59-132710 discloses a device for a similar purpose. A springbiassed plunger is provided between a spindle of a machine tool and a drill chuck rotatably mounted in the spindle. The drill chuck is formed with a recess in which the tip of the plunger is adapted to engage. If the resistance applied to a drill mounted on the drill chuck exceeds a predetermined level, the plunger gets out of the recess in the drill chuck, disengaging the drill chuck from the spindle. Simultaneously, a torque switch operates. This prevents the drill from being broken.

Also, other devices are known which are adapted to detect electrically the vibrations or noise that occur upon the breakage of a drill, giving an alarm or stopping the machine tool.

Since the device disclosed in the Japanese publication No. 59-132710 is designed for electrical detection, it requires an electrical circuit including a slip ring to take out an electrical signal from the rotating part. Also, the torque switch used can fail due to the vibration when mounting the adapter, etc.

Also, other prior art devices require that part of the electrical circuit be mounted on or near the rotating part. The electrical circuit is troublesome to arrange. The device is liable to fail and malfunction owing to noise. Another problem is that it takes time to remove the broken tool and this makes impossible automatic change of an adapter.

An object of the present invention is to provide a tool abnormality detector which obviates the abovesaid shortcomings.

In accordance with the present invention, there is provided a tool abnormality detecting device for use with a machine tool having a main body, a spindle, an adapter removably mounted in the spindle, a tubular body secured to the adapter, and a tool mounting shaft rotatably mounted in the tubular body to carry a tool, said device comprising: a ring mounted on said tubular body so as to allow said tubular body to rotate, a hollow pin mounted in said ring at part of the outer periphery of said ring so as to extend parallel to said adapter, said hollow pin being adapted to be received by said main body, a coupling means for coupling said tool mounting shaft with said tubular body until the resistance applied to said tool mounting shaft exceeds a predetermined value, the bore in said hollow pin being connected to a source of compressed air when said hollow pin is received in said main body of the machine tool, said ring being formed with a radial passage for compressed air, said tubular body being formed with an exhaust passage communicating with said radial passage in said ring, said tool mounting shaft being formed with a passage extending therethrough diametrically, said exhaust passage in said tubular body being communicated with the outside air by said passage in said tool mounting shaft in one condition and being blocked by said tool mounting shaft in another condition, and a pressure sensor provided in a line connected to said source of compressed air for detecting any sharp increase in the air pressure in said line.

While the machining is normally done by a tool mounted on the lower end of the tool mounting shaft mounted in the the tubular body, the tubular body and the tool mounting shaft are rotating together, keeping a relative position therebetween. In this state, the exhaust passage at front of the tubular body is communicated to the outside air by the passage extending crosswise through the tool mounting shaft. Thus, compressed air supplied through the hollow pin is exhausted to the outside air through the exhaust passage formed in the tubular body. Thus, the air pressure in the air supply line is kept constant. If an abnormally large resistance is applied to the tool mounting shaft for some cause, the tool mounting shaft lags with respect to the rotation of the tubular body. Thus, the exhaust passage in the tubular body is blocked by the tool mounting shaft, so that the air pressure in the air supply line increases sharply. The pressure sensor detects the sharp pressure increase to stop the spindle from rotation.

This makes it possible to take a suitable measure before the tool is broken or otherwise damaged. This eliminates the production of defective products due to poor machining or breakage of the tool. In unmanned operations, this makes it possible to continue operation by automatically replacing with a spare adapter.

The device according to the present invention requires no electrical devices on or near any rotating or vibrating parts. Only the electrical devices necessary are a pressure sensor and a control circuit connected to the pressure sensor. This eliminates failure due to vibration and malfunction caused by electrical noises.

In accordance with the present invention, when the adapter is mounted in the spindle, the hollow pin coupled to the adapter parallel to it is received by a bush secured to the machine body, so that the bore of the hollow pin communicates with the air supply passage in the bush. Thus, connection of the air circuit is automatically and securely performed.

Other features and advantages of the present invention will become apparent from the following description taken with reference to the accompanying drawings, in which.

Figure 1:
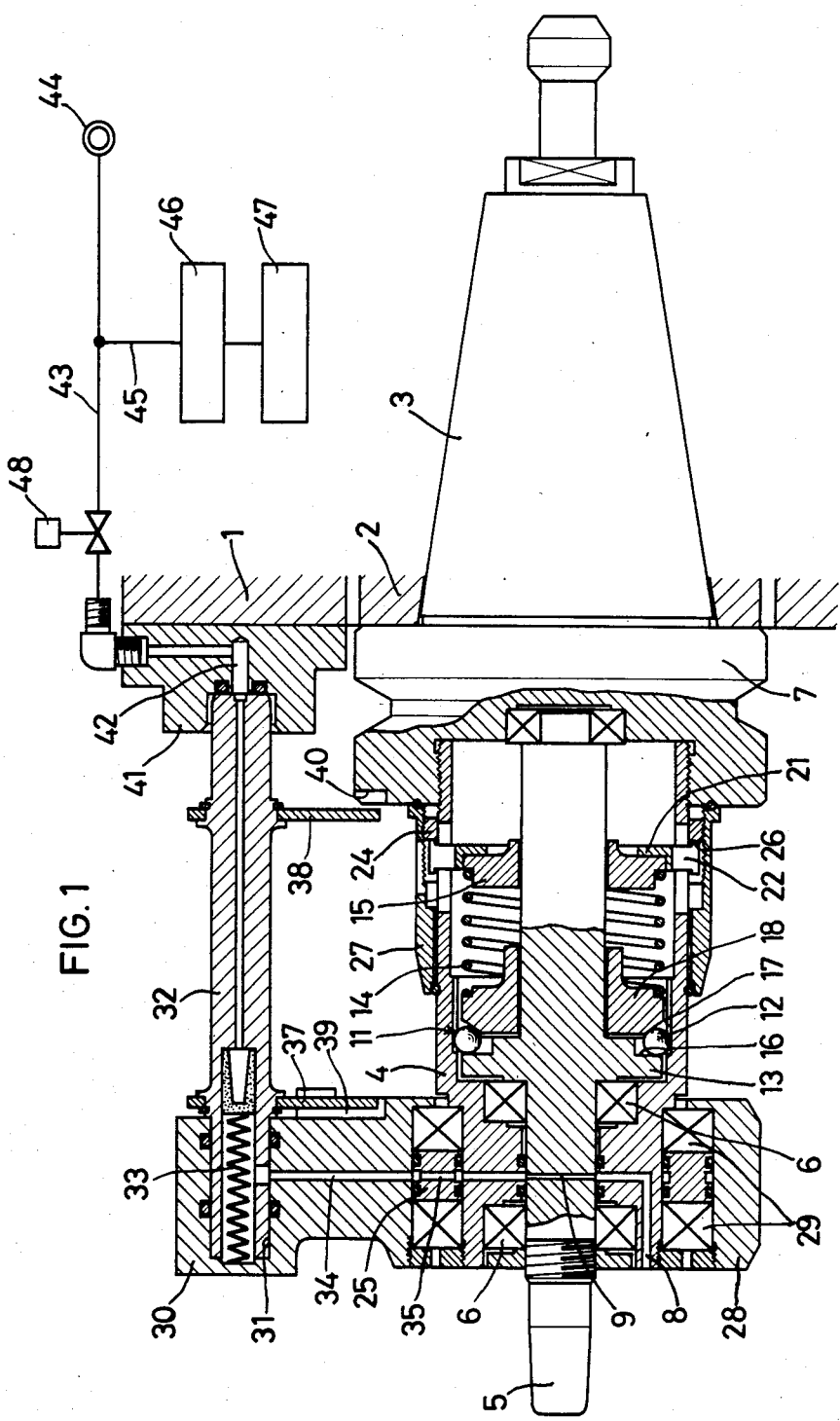
FIG. 1 is a vertical sectional view of the device embodying the present invention.
Figure 2:
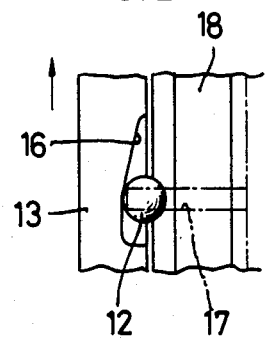
FIG. 2 is a partially cutaway development view of a coupling means.

Referring to the drawings, numeral 1 designates the main body of a machine tool, e.g. a numerically controlled machine tool or machining center. It has a spindle 2 formed with a tapered hole to removably receive a tapered adapter 3. The adapter 3 is automatically taken out of a tool magazine by means of a robot hand or other automatic tool changer (not shown) and is removably mounted in the spindle 2.

A tubular body 4 is concentrically secured to an enlarged portion 7 of the adapter 3. A tool mounting shaft 5 is mounted in the tubular body 4 with its frontal portion concentrically and rotatably supported by a pair of bearings 6 and with its front end projecting from the front end of the tubular body 4.

Figure 3:
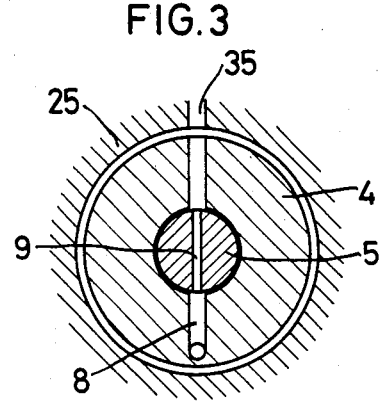
FIGS. 3 and 4 are sectional views showing the positional relationship between the tubular body and the tool mounting shaft.

The tubular body 4 is formed with an exhaust passage 8 at its frontal portion. The passage 8 extends radially from one side of the tubular body 4, across its bore, and opens at its front end. The tool mounting shaft 5 is formed with a passage 9 extending therethrough diametrically. The passage 9 communicates with the exhaust passage 8 when the tool mounting shaft 5 is in a correct position with respect to the tubular body 4 (FIG. 3).

A coupling member 11 is provided to couple the tool mounting shaft 5 with the tubular body 4. The coupling member 11 comprises a ball 12, a flange 13 integrally formed on the tool mounting shaft 5, a ball presser 18, a spring 14 for pressing the ball presser 18 and the ball 12 against the flange 13, and a spring support 15.

As shown in FIG. 1, the flange 13 is formed with an annular recess 16 to partially receive the ball 12 and the tubular body is formed in its inner wall with an axial groove 17 to partially receive the ball 12. The ball presser 18 slidably mounted on the tool mounting shaft 5 has a tapered surface at its front end and presses the ball 12 into the recess 16 in the flange 13 and outwardly into the axial groove 17 in the tubular body 4.

The flange 13 is supported by the front bearing 6. The spring support 15 has its rear portion supported by a support ring 21 in the tubular body 4. The support ring 21 has a pair of projections 22 extending toward the opposite sides and adapted to be received in axially extending guide holes formed in the tubular body 4 so as to be axially movable, but not to be rotatable with respect to the tubular body 4. The projections 22 are engaged in notches 26 formed in a threaded ring 24 slidably mounted on the tubular body 4.

An adjusting tube 27 turnably mounted on the tubular body 4 is female threaded to threadedly engage the threaded ring 24. The adjusting tube 27 has its rear end supported by the enlarged portion 7 of the adapter 3. Rotation of the adjusting tube 27 moves back and forth the threaded ring 24 and thus the support ring 21 and the spring support 15 to adjust the bias of the spring 14. This makes it possible to change the magnitude of the resistance applied to the tool mounting shaft 5 when the tool abnormality detector of the present invention operates.

A ring 28 is mounted on the frontal portion of the tubular body 4 through a pair of bearings 29 so as to be rotatable but not be reciprocatable with respect to the tubular body 4. A bracket 30 is integrally formed on the ring 28 at part of its periphery. The bracket 30 is formed with a guide hole 31 at its one end to slidably receive a hollow pin 32. The guide hole 31 is closed at its front end. A spring 33 in the guide hole 31 biasses the pin 32 rearwardly. The bracket 30 is formed with a radial exhaust passage 34 which communicates the bore of the hollow pin 32 with the exhaust passage 8 formed in the tubular body 4.

An annular distance piece 25 is mounted on the tubular body 4 between the bearings 29 and is formed in its inner and outer peripheral surfaces with annular grooves extending circumferencially and communicated with each other by a radial passage 35. This arrangement assures that the communication between the radial passage 35 and the exhaust passage 8 in the tubular body 4 is always maintained even when the tubular body 4 rotates with respect to the bracket 30.

A pair of projections 37, 38 are secured to the hollow pin 32 and are adapted to be received in recesses 39, 40 formed in the bracket 30 and the enlarged portion 7, respectively, to prevent the hollow pin 32 from turning with respect to the bracket 30 even if the hollow pin moves axially.

A bush 41 is secured to the main body 1. It is adapted to receive the rear end of the hollow pin 32 when the adapter 3 is mounted in the spindle 2. The bush 41 is formed with an air supply passage 42 so as to communicate with the bore of the hollow pin 32.

An air supply line 43 connects the air supply passage 42 with a source 44 of compressed air such as an air compressor and a reservoir tank. A branch line 45 is provided with a pressure sensor 46 such as a pressure switch which is connected with a control amplifier 47 from which signals for controlling the machining center are given.

The air supply line 43 is provided with a solenoid valve 48 between the air supply passage 42 and the branch line 45. The electric circuit is so arranged that directly before the adapter 3 is mounted in the main spindle 2, the solenoid valve 48 will open to eject compressed air out of the air supply passage 42.

Operation of the preferred embodiment will be described below.

When the adapter 3 is not mounted in the spindle 2, the projection 38 on the hollow pin 32 is in the recess 40 formed in the enlarged portion 7. When the adapter 3 is fitted into the spindle 2 e.g. by an automatic tool changer, the rear end of the hollow pin 32 fits in the bush 41 secured to the main body 1. The hollow pin will be retracted slightly against the bias of the spring 33, so that the projection 38 gets out of the recess 40 and the projection 37 fits in the recess 39, as shown in FIG. 1. Now, the air supply passage 42 communicates through the hollow pin 32 with the exhaust passage 8.

As described before, directly before the adapter 3 is mounted in the spindle 2, the solenoid valve 48 will open, so that compressed air from the compressed air source 44 will start to be jetted from the air supply pasage 42. The compressed air blows dust out of the air supply passage 42 and off the rear end of the hollow pin 32 which comes near to the bush 41.

When the spindle 2 starts to rotate with the adapter 3 mounted therein, a tool (not shown) mounted on the tool mounting shaft 5 starts to machine the work. While the machining is done in a normal condition, the rotation of the tubular body 4 is transmitted to the tool mounting shaft 5 through the ball 12, so that the tool mounting shaft is kept in a predetermined position with respect to the tubular body 4. Thus, as shown in FIGS. 1 and 3, the exhaust passage 8 communicates with the passage 9.

Compressed air from the air supply pasage 42 flows through the hollow pin 32, the exhaust passage 34, the radial passage 35, the exhaust passage 8 and the passage 9 and is exhausted to the outside air. Thus, the air pressure in the air supply line 43 is kept at a normal value and the pressure sensor 46 will not work.

Figure 4:
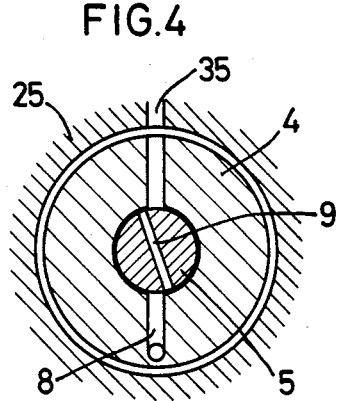

If in the machining operation the resistance applied to the tool mounting shaft 5 rises above a predetermined value due to the wear of the tool, improper selection of the tool, etc., the positional relationship between the tubular body 4 and the tool mounting shaft 5 would change as shown in FIG. 4. In other words, the tool mounting shaft 5 will not follow the rotation of the tubular body 4. As will be seen from FIG. 4, the exhaust passage 8 in the tubular body 4 is blocked by the tool mounting shaft 5.

As a result, the air pressure in the air supply line 43 will increase sharply. The pressure sensor 46 detects the increase of the air pressure and gives a signal to the control amplifier 47, which amplifies the signal and sends the amplified signal to the controller for the machining center, which stops the spindle 2.

Simultaneously with the stop of the main spindle 2, an acoustic or optical alarm will operate to alarm the abnormality. The operator can check the tool and replace the adapter, if necessary. In the unmanned operation at night, after the stop of the main spindle, the automatic tool changer will operate to replace the adapter with a spare one. This minimizes the downtime of the machining center.

Although in the preferred embodiment the arrangement is such that the air flow is blocked in case of abnormality, it may be the reverse. That is to say, the arrangement may be such that the exhaust passage is blocked when normal and is opened in an abnormal condition.

What we claim:

1. A tool abnormality detecting device for use with a machine tool having a main body, a spindle, an adapter removably mounted in the spindle, a tubular body secured to the adapter, and a tool mounting shaft rotatably mounted in the tubular body to carry a tool, said device comprising: a ring mounted on said tubular body so as to allow said tubular body to rotate, a hollow pin mounted in said ring at part of the outer periphery of said ring so as to extend parallel to said adapter, said hollow pin being adapted to be received by said main body, a coupling means for coupling said tool mounting shaft with said tubular body until the resistance applied to said tool mounting shaft exceeds a predetermined value, the bore in said hollow pin being connected to a source of compressed air when said hollow pin is received in said main body of the machine tool, said ring being formed with a radial passage for compressed air, said tubular body being formed with an exhaust passage communicating with said radial passage in said ring, said tool mounting shaft being formed with a passage extending therethrough diametrically, said exhaust passage in said tubular body being communicated with the outside air by said passage in said tool mounting shaft in one condition and being blocked by said tool mounting shaft in another condition, and a pressure sensor provided in a line connected to said source of compressed air for detecting any sharp increase in the air pressure in said line.

2. A tool abnormality detecting device as claimed in claim 1, further comprising a spring for urging said hollow pin toward said machine tool.

3. A tool abnormality detecting device as claimed in claim 1, wherein said coupling means comprises a ball partially received in an axial groove formed in the inner wall of said tubular body, a flange integrally formed on said tool mounting shaft, a ball presser, and a spring for pressing said ball presser and said ball against said flange.

* * * * *